United States Patent [19]
Dewberry et al.

[11] Patent Number: 4,799,293
[45] Date of Patent: Jan. 24, 1989

[54] QUICK MOUNT RESILIENT FINGER FOR POULTRY PLUCKING APPARATUS OR THE LIKE

[75] Inventors: Larry S. Dewberry, Marietta, Ga.; Richard H. Schlipp, Delafield, Wis.

[73] Assignee: Waukesha Rubber Company, Inc., Waukesha, Wis.

[21] Appl. No.: 153,994

[22] Filed: Feb. 9, 1988

[51] Int. Cl.$^4$ .............................................. A22C 21/02
[52] U.S. Cl. .................................................. 17/11.1 R
[58] Field of Search ...................................... 17/11.1 R

[56] References Cited

U.S. PATENT DOCUMENTS

| | | |
|---|---|---|
| 1,372,595 | 3/1921 | Bouda . |
| 2,300,157 | 10/1942 | Hunt . |
| 3,537,128 | 11/1970 | Zebarth et al. ............... 17/11.1 R |
| 3,797,068 | 3/1974 | Dillon ............................ 17/11.1 R |
| 4,282,632 | 8/1981 | Conaway ...................... 17/11.1 R |

*Primary Examiner*—Willie G. Abercrombie
*Attorney, Agent, or Firm*—Andrus, Sceales, Starke & Sawall

[57] ABSTRACT

A resilient finger for use in connection with a poultry plucking apparatus or the like is provided with a head portion capable of being pushed through an opening provided in a movable member associated with the apparatus. The head portion is provided with a resilient base portion which deforms sufficiently so as to allow the head portion to pass through the opening provided in the movable member. After passing through the opening, the resilient base portion returns to its undeformed state and grips the area of the movable member adjacent the opening against a shoulder portion formed on the shank of the resilient finger. A neck having a reduced transversed dimension relative to the shoulder and the base of the head portion is disposed within the opening upon installation. The head may be provided with one or more spiral threads which are engageable by one or more teeth projecting into the opening to facilitate mounting of the finger on the movable member. Alternatively, the head portion can be rounded and provided with a flared lip which deforms during mounting and returns to its underformed state thereafter so as to grip the movable member.

5 Claims, 3 Drawing Sheets

QUICK MOUNT RESILIENT FINGER FOR POULTRY PLUCKING APPARATUS OR THE LIKE

BACKGROUND AND SUMMARY

This invention relates to a poultry processing apparatus or the like, and more particularly to a resilient finger for use in connection with such an apparatus.

A poultry processing apparatus for plucking feathers from poultry generally includes a series of movable members having a plurality of resilient fingers connected thereto. One type of plucking apparatus utilizes a pair of spaced rotatable drums, each having a number of resilient fingers mounted to its side. The drums are arranged so that a space is provided between the resilient fingers. The poultry is passed through the space between the drums while the drums are rotating, and the action of the fingers on the poultry removes the feathers from the poultry. Another type of plucking apparatus utilizes a series of opposed spaced rotatable discs. Each disc has a series of resilient fingers mounted thereto and extending therefrom toward the opposed series of discs. The poultry is passed through the space between the discs while the discs are rotated, and the action of the fingers mounted to the discs removes the feathers from the poultry as it passes between the discs.

The resilient fingers utilized in connection with each of the above-described plucking machines generally include a shank portion terminating at a shoulder portion, a neck portion of reduced diameter relative to the shoulder portion, and a head portion connected to the neck portion. The discs or drums are provided with a number of openings therethrough, each of which is adapted to receive one resilient finger. A known method of mounting the fingers to the discs or drums involves inserting the tip of the finger through the opening from the rear side of the disc or drum, and then pulling on the ribbed section to distort the shank portion until the neck snaps into the opening. The finger is then retained on the disc or drum by engagement of the area adjacent the opening between the head portion and the shoulder portion.

Mounting the resilient fingers to the discs or drums as described can be a difficult and time consuming operation. It is typical to grip the shank of the finger with a clamping type jawed tool after insertion through the opening, and then to pull outwardly on the tool away from the drum or disc to engage the neck portion with the opening. However, the shank of the finger must deform a significant amount in order to allow the finger to pass through the opening so as to engage the neck portion with the edges of the opening. This generally requires tee person performing the installation to exert a great amount of force in order to install the fingers as described. Further, the amount of time involved in performing this installation procedure can result in a substantial amount of maintenance time for the entire machine, which can be costly and inefficient. Also, with a disc type plucking machine, access to the openings near the center of the disc from the rear may be obstructed by the disc housing.

The present invention is intended to provide a mounting structure for a resilient finger for use in a poultry processing apparatus or the like, and is designed to eliminate or alleviate the above-discussed shortcomings of previous structures. In accordance with the invention, a mounting structure for a member, such as a resilient finger, adapted to be mounted to a movable member for a poultry processing apparatus or the like through an opening provided therein comprises a shoulder portion provided on the resilient member and having a transverse dimension greater than that of the opening in the movable member. A neck portion is provided adjacent the shoulder portion, and has a reduced transverse dimension relative thereto. A head portion is provided on the resilient member adjacent the neck portion, and has a resilient base portion adjacent the neck portion with a transverse dimension greater than that of the neck portion, and at least slightly greater than that of the opening in the movable member. The resilient finger is capable of being mounted to the movable member by pushing the head portion through the opening therein so that the base portion of the head portion deforms a sufficient amount so as to allow the head portion to pass through the opening. Thereafter, the neck portion is disposed within the opening, and the base portion returns to its undeformed state so that the movable member is gripped between the base portion and the shoulder portion so as to retain the resilient finger on the movable member. In one embodiment, the head portion has side portions extending between the base portion and a top which is spaced from the base portion. The side portions of the head portion are provided with one or more threads which are adapted to engage one or more teeth provided on the movable members and which extend into the openings provided therein. The resilient finger is twisted during mounting to the movable member, and mounting of the resilient finger to the movable member is facilitated by the engagement of the one or more threads on the head portion with the teeth provided in the opening.

A method is also disclosed which contemplates mounting a resilient finger to a movable member by pushing a head portion through an opening provided therein, generally in accordance with the above-noted features of the resilient finger.

BRIEF DESCRIPTION OF THE DRAWINGS

The drawings illustrate the best mode presently contemplated of carrying out the invention.

In the drawings.

DETAILED DESCRIPTION OF THE PREFERRED EMBODIMENT

Figure 1:
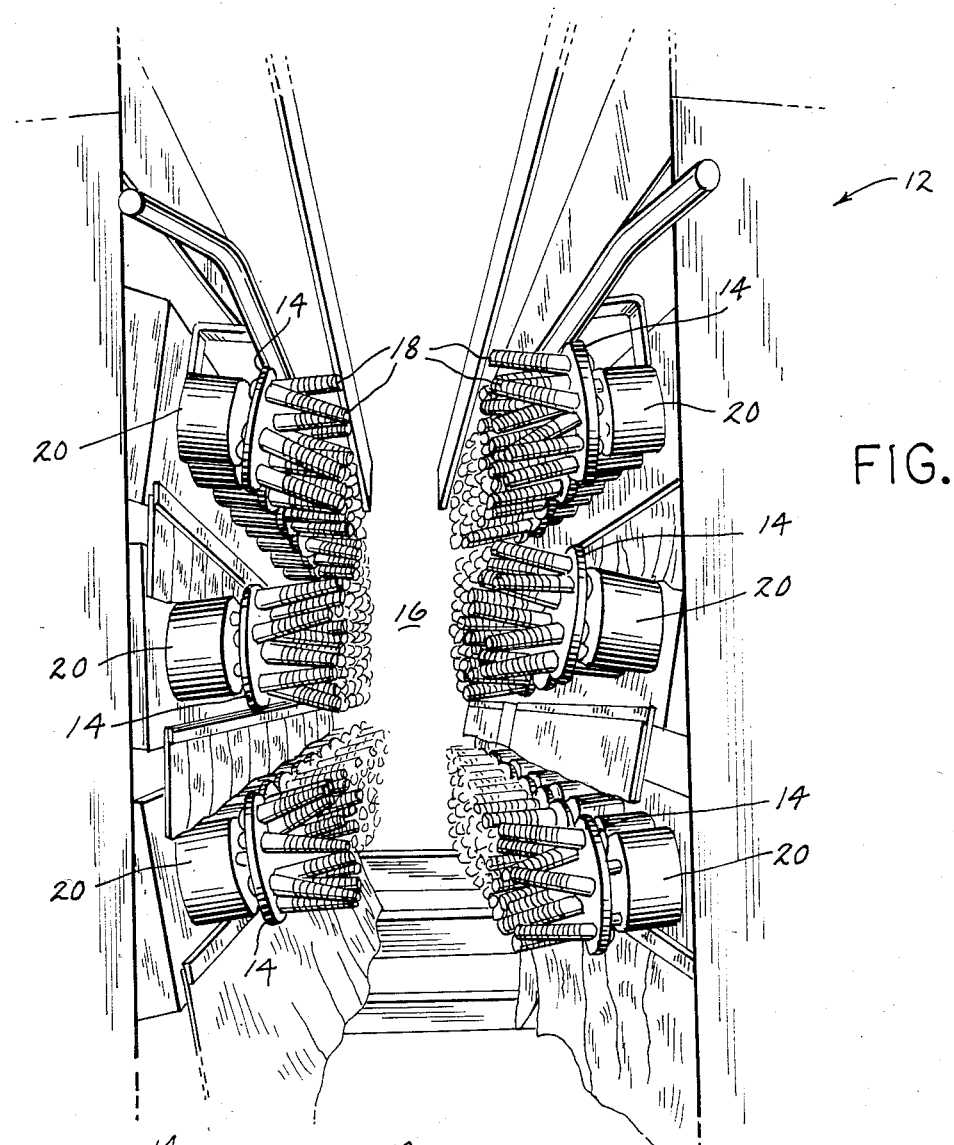
FIG. 1 is a perspective view of a disc-type poultry plucking apparatus.

As shown in FIG. 1, a disc type poultry plucking machine 12 includes a number of rows of aligned discs, shown at 14. The rows of discs 14 are provided on opposite sides of a passage 16 through the machine, through which poultry such as chickens, turkeys or the like pass during processing. Plucking machine 12 is designed to remove feathers from poultry as it passes through passage 16.

A plurality of resilient fingers, shown at 18, are mounted to each disc 14 through a plurality of openings provided therein. Fingers 18 are constructed of a resilient material such as a rubber compound, and generally have a durometer reading between 55 and 70 on an A scale. Each disc 14 is connected to a housing 20, and each disc 14 is rotatable about its central axis on housing 20. Such rotation of discs 14 about their central axes causes fingers 18 to move in a circular path thereabout.

Each finger 18 is provided with a series of ribs 22 on its shank portion 24. During operation of plucking machine 12 as described, ribs 22 impinge upon the poultry passing through passage 16 to remove feathers from the poultry.

Figure 2:
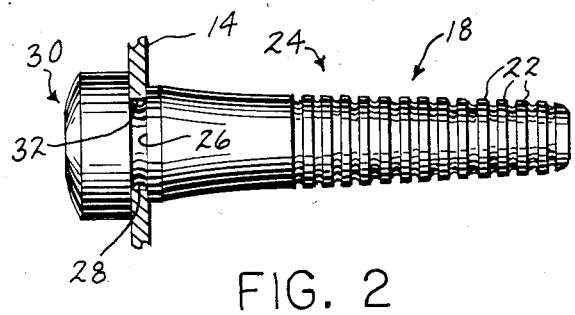
FIG. 2 is a side elevation view, partially in section, showing a prior art resilient finger for use in connection with the apparatus of FIG. 1.

FIG. 2 shows a prior art construction for resilient fingers 18. Shank portion 24 of finger 18 terminates in a shoulder 26, from which a neck portion 28 extends. An enlarged head portion 30 is connected to neck portion 28. As shown, the proximal end of shank portion 24 adjacent shoulder 26 has a transverse dimension greater than that of an opening 32 provided in disc 14. Neck portion 28 has a transverse dimension less than that of opening 32, and head portion 30 has a transverse dimension substantially larger than that of opening 32. With this construction, shank 24 is inserted through opening 32 in disc 14 from the rear, and then drawn through opening 32 by pulling shank portion 24 therethrough. The proximal end of shank portion 24 deforms sufficiently during this operation so as to allow passage of shank portion 24 through opening 32. Thereafter, neck portion 28 is disposed within opening 32 and shoulder 26 engages the area of disc 14 adjacent opening 32 on one side, while head portion 30 engages the other side of disc 14 adjacent opening 32. In this manner, disc 14 is "gripped" between head portion 30 and shoulder portion 26 so as to retain finger 18 on disc 14.

Figure 3:
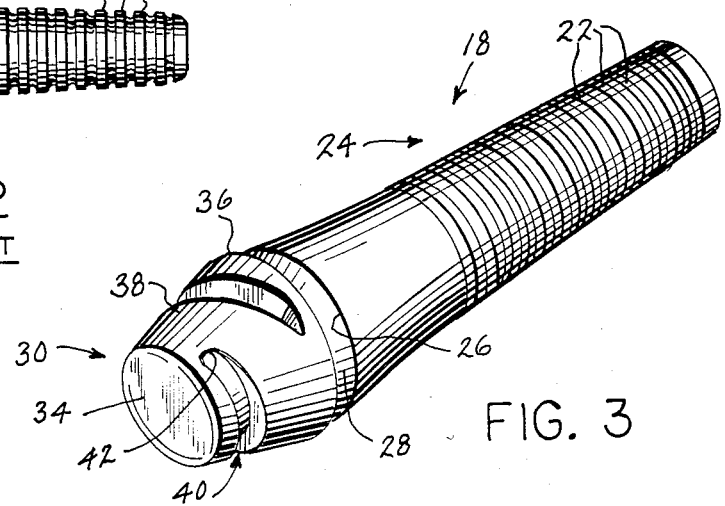
FIG. 3 is an isometric view of a resilient finger constructed according to the invention for use with the apparatus of FIG. 1.
Figure 4:
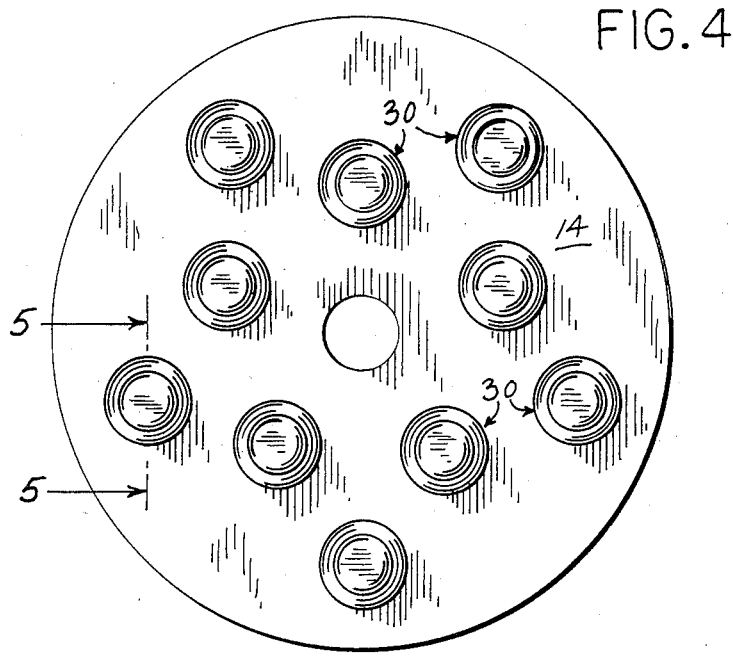
FIG. 4 is an elevation view showing an individual disc from the poultry plucking apparatus of FIG. 1 to which a plurality of fingers constructed according to the invention are mounted.

FIG. 3 shows an improved resilient finger for use with plucking machine 12 in place of the construction shown in FIG. 2. In the drawings, like reference characters will be used to describe the finger according to the invention to facilitate clarity. As shown in FIG. 3, finger 18 includes a series of ribs 22 formed on shank portion 24. A shoulder portion 26 is formed on the proximal end of shank portion 24, from which a neck portion 28 extends. Head portion 30 is substantially frusto-conical in shape, and includes a top 34 spaced from a base 36. A side 38 extends between top 32 and base 34, and is disposed at an angle to top 34 so as to increase the width of head portion 30 toward base 36.

Figure 5:
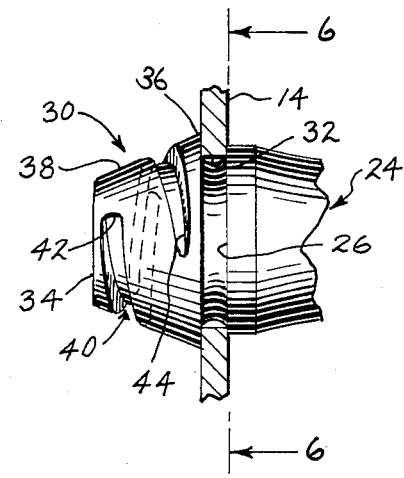
FIG. 5 is a partial sectional view taken generally along line 5—5 of FIG. 4.

As shown in FIG. 5, the transverse dimension of base 36 of head portion 30 is greater than that of opening 32 in disc 14.

Side portion 38 of head 30 is provided with a helical groove or thread, shown at 40. Helical thread 40 extends from a point just below top 34, shown at 42, around side portion 38 of head 30, and terminates at a terminus 44 disposed above and adjacent base portion 36 of head 30.

Figure 6:
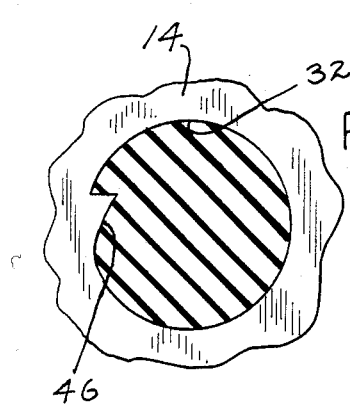
FIG. 6 is a sectional view taken generally along line 6—6 of FIG. 5.

As shown in FIG. 6, a tooth 46 is formed in plate 14 and projects into opening 32. Tooth 46 is adapted to engage helical thread 40 to facilitate the mounting of finger 18 to disc 14.

To install finger 18 as shown in FIGS. 3 and 5 onto disc 14, top 34 of head 30 is inserted from the front of disc 14 through opening 32. Tooth 46 is engaged with helical thread 40 at or adjacent point 42. Head 30 is pushed through opening 32 while turning finger 18 so that, due to such pushing and twisting of shank 24, head 30 advances within opening 32. When tooth 46 reaches terminus 44 of thread 40, additional force is applied to finger 18 so as to force base portion 36 of head 30 through opening 32. Base portion 36 of head 30 deforms sufficiently to allow head 30 to pass through opening 32, whereafter neck portion 28 is disposed within opening 32. After passing through opening 32, head portion 30 returns to its original undeformed condition, with base portion 36 engaging the area of disc 14 adjacent opening 32. Shoulder 26 of shank 24 engages the area of disc 14 adjacent opening 32 on the other side of disc 14. In this manner, disc 14 is essentially "gripped" between base portion 36 of head 30 and shoulder portion 26 of shank 24 to firmly retain finger 18 on disc 14. If necessary, a suitable lubricant such as soap can be used to facilitate passage of head portion 30 through opening 32.

Figure 7:
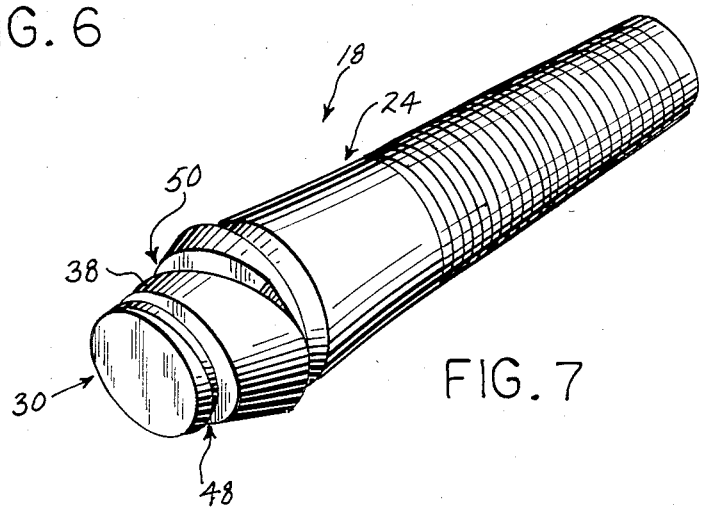
FIG. 7 is an isometric view similar to FIG. 3, showing another embodiment of the resilient finger constructed according to the invention.
Figure 8:
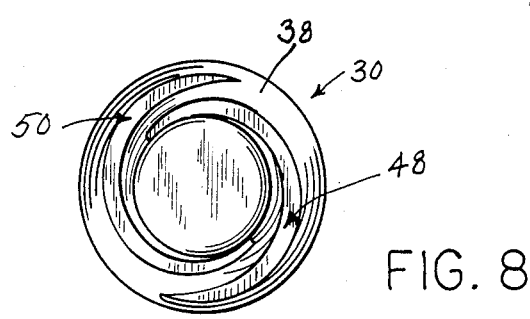
FIG. 8 is a top elevation view of the head portion of the resilient finger of FIG. 7.

Another embodiment of the invention is shown in FIGS. 7 and 8. In this embodiment, a pair of helical threads, shown at 48, 50 are provided on side portion 38 of head 30. Each thread 48, 50 extends less than a full turn around the circumference of head 30. With this construction, a pair of teeth are provided in opening 32 to engage the distinct threads 48, 50. Finger 18 is mounted to disc 14 as above described, with each tooth engaging a separate thread.

Figure 9:
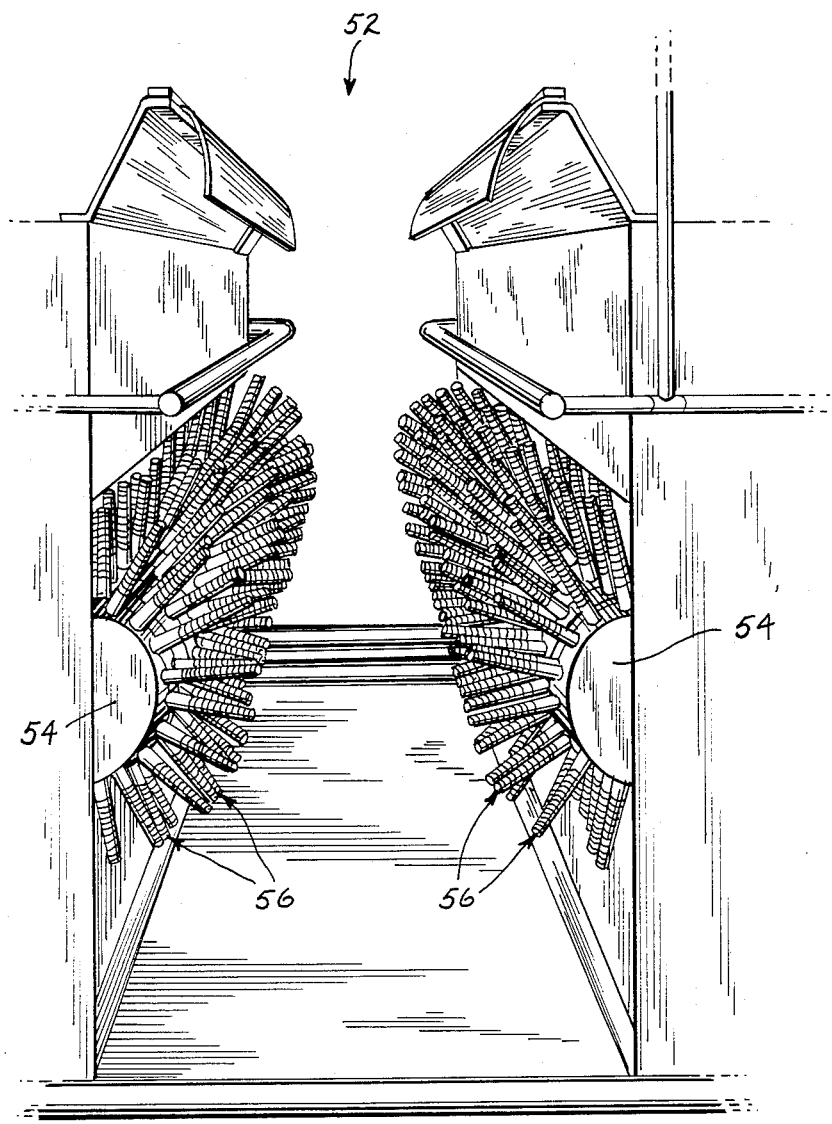
FIG. 9 is a perspective view of a drum type poultry plucking apparatus.

With reference to FIG. 9, a drum type poultry plucking machine is shown generally at 52. Drum type plucking machine 52 includes a pair of spaced rotatable drums 54, each of which is rotatable about its longitudinal axis. A plurality of fingers 56 are mounted to drums 54 so as to extend outwardly therefrom. Fingers 56 used with drum type plucking machine 52 are more elongated and slender than fingers 18 used with disc type plucking machine 12, and generally have a durometer reading between 45 and 60 on an A scale. Fingers 56 are adapted for mounting to drums 54 through a series of spaced openings provided in the side walls of drums 54.

Figure 10:
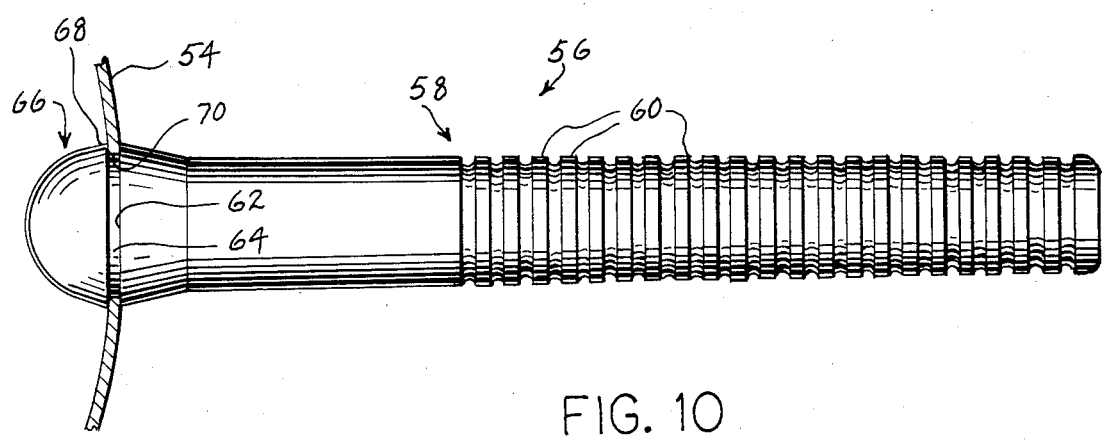
FIG. 10 is a view similar to FIGS. 2 and 5, showing an alternate embodiment for a resilient finger constructed according to the invention for use with the apparatus of FIG. 9.

With reference to FIG. 10, finger 56 includes a shank portion 58 on which a series of ribs 60 are formed. A shoulder 62 is provided at the proximal end of shank 58 adjacent drum 54. A neck 64 extends from shoulder 62 and has a reduced transverse dimension relative to shoulder 62. A head portion 66 extends from neck portion 64. Head portion 66 is relatively rounded in shape, and includes a flared circumferential lip 68 at its base adjacent neck 64.

To install finger 56 onto drum 54 through an opening, such as 70, formed therein, head portion 66 is inserted into opening 70. Finger 56 is then pushed toward drum 54 so that head portion 66, and more particularly lip 68, deforms inwardly toward neck 64 a sufficient amount to allow head portion 66 to pass through opening 70. Once head 66 has passed through opening 70, neck portion 64 is disposed within opening 70 and flared lip 68 returns to its undeformed state. The area of drum 54 adjacent opening 70 is then gripped between shoulder 62 and the base portion of flared lip 68 to retain finger 56 on drum 54. Again, a suitable lubricant can be used to facilitate passage of head portion 66 through opening 70 in drum 54.

It is contemplated that a tapered sleeve type tool will aid in the installation of the resilient fingers described above. The taper of the shank of the resilient finger, to provide a sure engagement of the tool with the finger. The sleeve is pushed and/or turned, either manually or with the aid of a driving mechanism, to install the fingers.

Various alternatives and modifications are contemplated as being within the scope of the following claims particularly pointing out and distinctly claiming the invention.

I claim:

1. A finger for use in a poultry processing apparatus or the like, said apparatus including one or more members adapted to receive one or more of said fingers through one or more openings provided therein, said finger being formed of a resilient material and comprising:
   a shank portion having a distal end and a proximal end, said shank portion including a shoulder portion adjacent said proximal end having a transverse dimension greater than that of said opening;
   a neck portion provided adjacent said shoulder portion and having a reduced transverse dimension relative thereto; and
   a substantially frusto-conical head portion provided adjacent said neck portion, said head portion including a resilient base portion adjacent said neck portion and a top portion spaced from said base portion, with a side portion extending between said base portion and said top portion, said resilient base portion having a transverse diension greater than that of said neck portion and at least slightly greater than that of said opening, said side portion being provided with one or more helical threads, said finger being adapted for mounting to said member by pushing said head portion through said opening so that said base portion deforms sufficiently to allow said head portion to pass therethrough, said neck portion thereafter being disposed within said opening with said shoulder portion engaging a surface of said member adjacent said opening, said base portion returning to its undeformed state after passing through said opening so that said member is gripped between said base portion and said shoulder portion so as to retain said finger on said member.

2. The finger according to claim 1, wherein said opening is provided with one or more inwardly extending teeth to engage said one or more helical threads.

3. The finger according to claim 2, wherein one end of said one or more helical threads is disposed adjacent said top portion of said head portion, and the other end of said spiral thread is disposed adjacent said base portion of said head portion.

4. The finger according to claim 3, wherein said one or more helical threads extends from a point below said top portion of said head portion to a terminus disposed above said base portion of said head portion.

5. The finger according to claim 3, wherein said one or more helical threads extends from said top portion of said head portion to a terminus disposed above said base portion of said head portion.

* * * * *

UNITED STATES PATENT AND TRADEMARK OFFICE
CERTIFICATE OF CORRECTION

PATENT NO. : 4,799,293

DATED : January 24, 1989

INVENTOR(S) : Larry S. Dewberry and Richard H. Schlipp

It is certified that error appears in the above-identified patent and that said Letters Patent is hereby corrected as shown below:

Claim 1, col. 6, line 4, Delete "diension" and substitute therefor ---dimension---

Signed and Sealed this

Twenty-fourth Day of October, 1989

Attest:

DONALD J. QUIGG

Attesting Officer

Commissioner of Patents and Trademarks